(12) United States Patent
Chen

(10) Patent No.: US 11,379,448 B2
(45) Date of Patent: *Jul. 5, 2022

(54) COLD MATCHING BY AUTOMATIC CONTENT RECOGNITION

(71) Applicant: Roku, Inc., San Jose, CA (US)

(72) Inventor: Juikun Chen, West Jordan, UT (US)

(73) Assignee: Roku, Inc., San Jose, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/946,862

(22) Filed: Jul. 9, 2020

(65) Prior Publication Data

US 2020/0341960 A1 Oct. 29, 2020

Related U.S. Application Data

(63) Continuation of application No. 15/703,684, filed on Sep. 13, 2017, now Pat. No. 10,803,038.

(51) Int. Cl.
*H04N 21/235* (2011.01)
*H04N 21/466* (2011.01)
(Continued)

(52) U.S. Cl.
CPC ........ *G06F 16/2246* (2019.01); *G06F 16/217* (2019.01); *G06V 20/46* (2022.01);
(Continued)

(58) Field of Classification Search
CPC .... G06F 16/2246; G06F 16/217; G06F 16/40; G06V 20/46; H04N 21/235;
(Continued)

(56) References Cited

U.S. PATENT DOCUMENTS

| 8,229,219 B1 | 7/2012 | Ioffe |
| 8,335,786 B2 * | 12/2012 | Pereira ................. G06F 16/783 |
| | | 707/747 |

(Continued)

FOREIGN PATENT DOCUMENTS

| CN | 102682298 | 9/2012 |
| EP | 2 437 498 | 4/2012 |

(Continued)

OTHER PUBLICATIONS

International Preliminary Report on Patentability from International Application No. PCT/US2018/050230, dated Mar. 17, 2020.

*Primary Examiner* — Nathan J Flynn
*Assistant Examiner* — Christine A Kurien
(74) *Attorney, Agent, or Firm* — McDonnell Boehnen Hulbert & Berghoff LLP

(57) ABSTRACT

A method for cold matching by automatic content recognition includes receiving, at data processing hardware, broadcast fingerprints indicative of broadcast frames of a broadcast media stream. The method also includes receiving, at the data processing hardware, media device fingerprints indicative of media device frames of a media device stream at a corresponding media device. The method further includes determining, by the data processing hardware, that a search block comprising a plurality of media device fingerprints corresponding to sequential media device frames of the media device stream includes at least one media device fingerprint having a match correlation to at least one broadcast fingerprint. The match correlation is based on a Pearson correlation coefficient. The method also includes identifying, by the data processing hardware, the at least one media device fingerprint having the match correlation to the at least one broadcast fingerprint as corresponding to a match media device frame.

19 Claims, 8 Drawing Sheets

(51) Int. Cl.
*G06F 16/21* (2019.01)
*H04N 21/47* (2011.01)
*G06F 16/22* (2019.01)
*H04N 21/44* (2011.01)
*H04N 21/81* (2011.01)
*H04N 21/431* (2011.01)
*G06V 20/40* (2022.01)
*H04N 21/442* (2011.01)
*G06F 16/40* (2019.01)

(52) U.S. Cl.
CPC ....... *H04N 21/235* (2013.01); *H04N 21/4316* (2013.01); *H04N 21/44008* (2013.01); *H04N 21/44226* (2020.08); *H04N 21/4667* (2013.01); *H04N 21/47* (2013.01); *H04N 21/812* (2013.01); *G06F 16/40* (2019.01)

(58) Field of Classification Search
CPC ......... H04N 21/4316; H04N 21/44008; H04N 21/44226; H04N 21/4667; H04N 21/47; H04N 21/812; H04N 21/8455
See application file for complete search history.

(56) References Cited

U.S. PATENT DOCUMENTS

| | | | | |
|---|---|---|---|---|
| 8,370,315 | B1 * | 2/2013 | Efstathopoulos | G06F 16/2228 707/699 |
| 8,577,077 | B2 * | 11/2013 | Zhang | H04H 60/37 725/19 |
| 8,688,731 | B2 * | 4/2014 | Ramanathan | G06F 16/41 707/913 |
| 8,786,785 | B2 * | 7/2014 | Hendrickson | H04N 21/8352 348/700 |
| 9,510,044 | B1 * | 11/2016 | Pereira | H04N 21/44204 |
| 2004/0237102 | A1 | 11/2004 | Konig et al. | |
| 2007/0124796 | A1 * | 5/2007 | Wittkotter | H04N 21/235 725/100 |
| 2010/0166250 | A1 | 7/2010 | Zhang | |
| 2012/0317240 | A1 | 12/2012 | Wang | |
| 2014/0196085 | A1 * | 7/2014 | Dunker | H04N 21/23424 725/36 |
| 2014/0201769 | A1 * | 7/2014 | Neumeier | H04N 21/462 725/14 |
| 2014/0201787 | A1 * | 7/2014 | Neumeier | H04N 21/44222 725/34 |
| 2014/0237496 | A1 * | 8/2014 | Julian | G06Q 30/02 725/13 |
| 2016/0234564 | A1 * | 8/2016 | Holyoak | H04N 21/4438 |
| 2016/0286285 | A1 * | 9/2016 | Geyzel | H04N 19/00 |
| 2016/0316261 | A1 | 10/2016 | Koshevoy | |
| 2017/0013324 | A1 * | 1/2017 | Chen | H04N 21/44008 |
| 2017/0026718 | A1 | 1/2017 | Yabu | |

FOREIGN PATENT DOCUMENTS

| | | |
|---|---|---|
| JP | 2008011316 | 1/2008 |
| WO | WO 2016106177 | 6/2016 |
| WO | WO 2016/200622 | 12/2016 |

* cited by examiner

COLD MATCHING BY AUTOMATIC CONTENT RECOGNITION

REFERENCE TO RELATED APPLICATION

This is a continuation of U.S. patent application Ser. No. 15/703,684, filed Sep. 13, 2017, the entirety of which is hereby incorporated by reference.

TECHNICAL FIELD

This disclosure relates to automatic content recognition and more particularly to cold matching by automatic content recognition.

BACKGROUND

Media devices today are becoming more and more common and may range from fixtures in a home, such as a television, to mobile devices traveling along with a media consumer. Media devices, such as televisions, set-top-boxes, mobile phones, laptops, and tablets, may access and may retrieve media content from a variety of sources. For example, a media device may receive media content via satellite, over-the-air broadcasting, or streaming systems from a wired or a wireless connection. As the use of media devices continues to increase, media device connectivity to media content has also increased. With this growth, new media content markets have emerged and old media content market have adapted to understand and to provide contextually-relevant media content to the media consumer.

SUMMARY

One aspect of the disclosure provides a method for cold matching by automatic content recognition. The method includes receiving, at data processing hardware, broadcast fingerprints indicative of broadcast frames of a broadcast media stream. The method also includes receiving, at the data processing hardware, media device fingerprints indicative of media device frames of a media device stream at a corresponding media device. The method further includes determining, by the data processing hardware, that a search block comprising a plurality of media device fingerprints corresponding to sequential media device frames of the media device stream includes at least one media device fingerprint having a match correlation to at least one broadcast fingerprint. The match correlation is based on a Pearson correlation coefficient. The method also includes identifying, by the data processing hardware, the at least one media device fingerprint having the match correlation to the at least one broadcast fingerprint as corresponding to a match media device frame.

Implementations of the disclosure may include one or more of the following optional features. In some implementations, the method includes determining, by the data processing hardware, whether the search block includes at least one media device fingerprint having the match correlation to more than one broadcast fingerprint. When the search block includes at least one media device fingerprint having the match correlation to more than one broadcast fingerprint, the method includes determining, by the data processing hardware a set of broadcast fingerprints corresponding to the at least one media device fingerprint of the search block, each broadcast fingerprint of the set being broadcast fingerprints of sequentially adjacent broadcast frames of the broadcast media stream and determining, by the data processing hardware, the match correlation as a Pearson correlation coefficient between the search block and the set of broadcast fingerprints. The method may further include determining, by the data processing hardware, a match media device frame as the media device frame corresponding to the media device fingerprint of the at least one media device fingerprint of the search block having the greatest Pearson correlation coefficient with a match broadcast fingerprint of the set of broadcast fingerprints.

In various implementations of the method, each fingerprint of the method represents the following: at least one pixel value of the frame of the corresponding media stream; an average pixel value representing a sum of a grayscale value of a corresponding frame; or more than one average pixel value of a sub-frame within a corresponding frame. In some examples, each fingerprint representing more than one average pixel value of a sub-frame within a corresponding frame is represented as a sixteen integer vector corresponding to each average pixel value of sixteen sub-frames, the sixteen sub-frames defining a four by four array of the corresponding frame.

In some implementations of the method, the broadcast frames correspond to a first period of time of broadcast media content and the media device frames correspond to a second period of time of media device content. The first period of time is greater than the second period of time. The method further includes associating, by the data processing hardware, a match media device frame with frame data comprising a frame number and an associated broadcast channel. The method may further include comparing, by the data processing hardware, the search block to a database structure defined by a plurality of broadcast fingerprints when the search block includes the at least one media device fingerprint having the match correlation to the at least one broadcast fingerprint. The database structure is a binary search tree.

Another aspect of the disclosure provides a system for cold matching by automatic content recognition. The system includes data processing hardware and memory hardware in communication with the data processing hardware. The memory hardware stores instructions that when executed on the data processing hardware cause the data processing hardware to perform operations. The operations include receiving broadcast fingerprints indicative of broadcast frames of a broadcast media stream and receiving media device fingerprints indicative of media device frames of a media device stream at a corresponding media device. The operations also include determining that a search block comprising a plurality of the media device fingerprints corresponding to sequential media device frames of the media device stream includes at least one media device fingerprint having a match correlation to at least one broadcast fingerprint. The match correlation is based on a Pearson correlation coefficient. The operations further include identifying the at least one media device fingerprint having the match correlation to the at least one broadcast fingerprint as corresponding to a match media device frame.

In some implementations, the operations further include determining whether the search block includes at least one media device fingerprint having the match correlation to more than one broadcast fingerprint. When the search block includes at least one media device fingerprint having the match correlation to more than one broadcast fingerprint, the operations include determining a set of broadcast fingerprints corresponding to the at least one media device fingerprint of the search block, each broadcast fingerprint of the set of broadcast fingerprints being broadcast fingerprints of sequentially adjacent broadcast frames of the broadcast media stream, and determining the match correlation as a Pearson correlation coefficient between the search block and the set of broadcast fingerprints. The operations further may include determining a match media device frame as the media device frame corresponding to the media device fingerprint of the at least one media device fingerprint of the search block having the greatest Pearson correlation coefficient with a match broadcast fingerprint of the set of broadcast fingerprints.

In various implementations of the system, each fingerprint of the method represents the following: at least one pixel value of the frame of the corresponding media stream; an average pixel value representing a sum of a grayscale value of a corresponding frame; or more than one average pixel value of a sub-frame within a corresponding frame. In some examples, each fingerprint representing more than one average pixel value of a sub-frame within a corresponding frame is represented as a sixteen integer vector corresponding to each average pixel value of sixteen sub-frames, the sixteen sub-frames defining a four by four array of the corresponding frame.

The system may also include broadcast frames that correspond to a first period of time of broadcast media content and to media device frames that correspond to a second period of time of media device content. The first period of time being is greater than the second period of time. In some implementations, the operations further include associating the match media device frame with frame data comprising a frame number and an associated broadcast channel.

In some examples, when the search block includes the at least one media device fingerprint having the match correlation to the at least one broadcast fingerprint, the operations further include comparing the search block to a database structure defined by a plurality of broadcast fingerprints wherein the database structure is a binary search tree.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Generally, automatic content recognition (ACR) is the automatic process of identifying media content on a media device or within a media file. ACR has become increasingly useful to identify vast amounts of media content consumed by society every day. From a commercial perspective, ACR may allow businesses and other entities to understand media content consumption and, perhaps more effectively, to market or to target consumers (i.e. media device users) of the media content. For example, an advertisement or an offer is likely more effective when the advertisement is personalized to the user of a media device. Accordingly, broadcasters, commercial providers, advertisers and other content entities want to know what programs are being viewed or, more particularly, where the user is in the program during viewing. With this type of information, the media device user may receive more precisely catered media content.

Figure 1A:
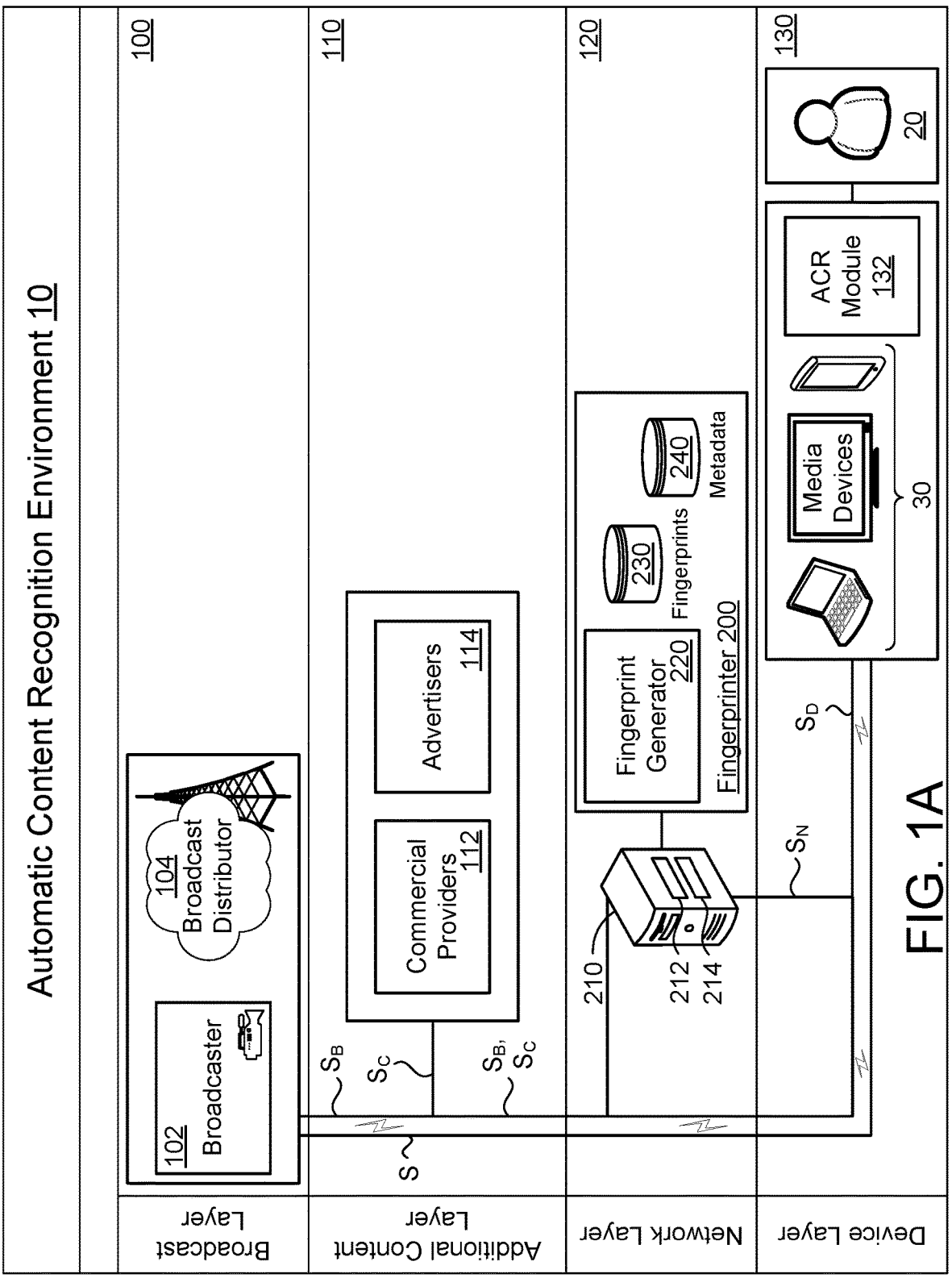
FIGS. 1A and 1B are schematic views of an example automatic content recognition environment.

FIG. 1A is an example of an ACR environment 10. The ACR environment 10 may include several layers to distribute media content to a user 20 (i.e., a viewer) of a media device 30. FIG. 1A attempts to simplify the media content distribution process into four layers: a broadcast layer 100; an additional content layer 110; a network layer 120; and a device layer 130. Each layer 100, 110, 120, 130 may have entities that influence a media stream S. The broadcast layer 100 represents broadcast entities that may be involved to produce a broadcast media stream $S_B$. These broadcast entities may include a broadcaster 102 and a broadcast distributor 104. The broadcaster 102 may be one or more media content providers such as local broadcasters, multi-channel networks, or other media content owners. The broadcast distributor 104 is a broadcast entity that provides infrastructure or resources (e.g., signal wires, communication towers, communication antennas, servers, etc.) to distribute media content. The broadcaster 102 and the broadcast distributor 104 may be the same broadcast entity or a different broadcast entity depending on broadcasting variables, such as a type of media content being provided or a type of media device receiving the media content.

In some implementations, the broadcast media stream $S_B$ includes additional media content $S_C$ from content entities represented as the additional content layer 110. These content entities include commercial providers 112, advertisers 114, or other entities contributing additional media content $S_C$ to the broadcast media stream $S_B$. Generally, commercial providers 112 are content entities that procure and/or host additional media content $S_C$, while advertisers 114 are content entities that generate the additional media content $S_C$ with content, such as advertisements, offers, deals, discounts, benefits, or other promotions of goods and/or services. Additionally or alternatively, the commercial providers 112 and the advertisers 114 may be the same content entity. The additional content layer 110 may communicate the additional media content $S_C$ to the broadcast layer 100, the network layer 120, the device layer 130, or any combination thereof. Optionally, the additional content layer 110 may pair the additional media content $S_C$ with the broadcast media stream $S_B$ to form a combined broadcast media stream $S_B$, $S_C$ that includes the additional media content $S_C$.

Referring further to FIG. 1A, the network layer 120 is configured to receive the broadcast media stream $S_B$ and the additional media content $S_C$ from the broadcast layer 100 and/or the additional content layer 110. For example, if the network layer 120 receives the media stream S from the broadcast layer 100, the network layer 120 may receive the broadcast media stream $S_B$ with the additional media content $S_C$ or independent of the additional media content $S_C$. Similarly, if the network layer 120 receives the media stream S from the additional content layer 110, the network layer 120 may receive the broadcast media stream $S_B$ with the additional media content $S_C$ or independent of the additional media content $S_C$. In some implementations, the network layer 120 may pair the broadcast media stream $S_B$ from the broadcast layer 100 with the additional media content $S_C$ from the additional content layer 110 to generate a network media stream $S_N$ representing the broadcast media stream $S_B$ impregnated with the additional media content $S_C$.

The network layer 120 includes a fingerprinter 200. The fingerprinter 200 is configured to operate on a server 210 having data processing hardware 212 and memory hardware 214. The fingerprinter 200 includes a broadcast fingerprint generator 220. The network layer 120 may be configured to store fingerprints 222 and metadata 224 related to the fingerprints 222 in a fingerprint database 230 and/or a metadata database 240. Generally, a fingerprint 222 is at least one unique identifier corresponding to at least one frame $F_n$ of the media stream S. For example, the at least one unique identifier may be a value (e.g., pixel value), an alphanumeric representation, or a compressed version of the audio visual image. Additionally or alternatively, the network layer 120 is configured to store the broadcast media stream $S_B$, the additional media content $S_C$, or both.

FIG. 1A also illustrates that any layer (i.e., the broadcast layer 100, the additional content layer 110, or the network layer 120) may communicate with the device layer 130. At the device layer 130, media devices 30, such as televisions, PCs, laptops, tablets, or mobile phones, receive a media device stream $S_D$ (e.g., any combination of the broadcast media stream $S_B$, the additional content stream $S_C$, or the network media stream $S_N$) and may convey all or a portion of the corresponding media device stream $S_D$ (e.g., any combination of the broadcast media stream $S_B$, the additional content stream $S_C$, or the network media stream $S_N$) to a user 20. A device may mean any hardware or any software related to a media device 30 configured to receive or to communicate some form of media content. Moreover, the device may include data processing hardware and/or memory hardware. In some implementations, the media devices 30 may be configured to interpret or to interact with the corresponding media stream (e.g., any combination of the broadcast media stream $S_B$, the additional content stream $S_C$, or the network media stream $S_N$). For example, the media devices 30 identify the additional media content $S_C$ from the broadcast media stream $S_B$. The media devices 30 may replace or overlay the additional media content $S_C$ of the broadcast media stream $S_B$ with replacement media content. The media devices 30 may filter the broadcast media stream $S_B$, $S_C$ for predefined content. Additionally or alternatively, the media devices 30 may be configured to communicate information or data related to the media stream (e.g., any combination of the broadcast media stream $S_B$, the additional content stream $S_C$, or the network media stream $S_N$) with the broadcast layer 100, the additional content layer 110, the network layer 120, or other media devices 30 of the device layer 130. The media device 30 may execute an ACR module 132 or be in communication with other data processing hardware executing the ACR module 132. The ACR module 132 may be configured to identify a content element (e.g., audio, video or digital image) within a media stream based on sampling a portion of the media stream, processing the sample, and comparing the sample with a source service that identifies content by unique characteristics, such as audio or video fingerprints or watermarks.

Figure 1B:
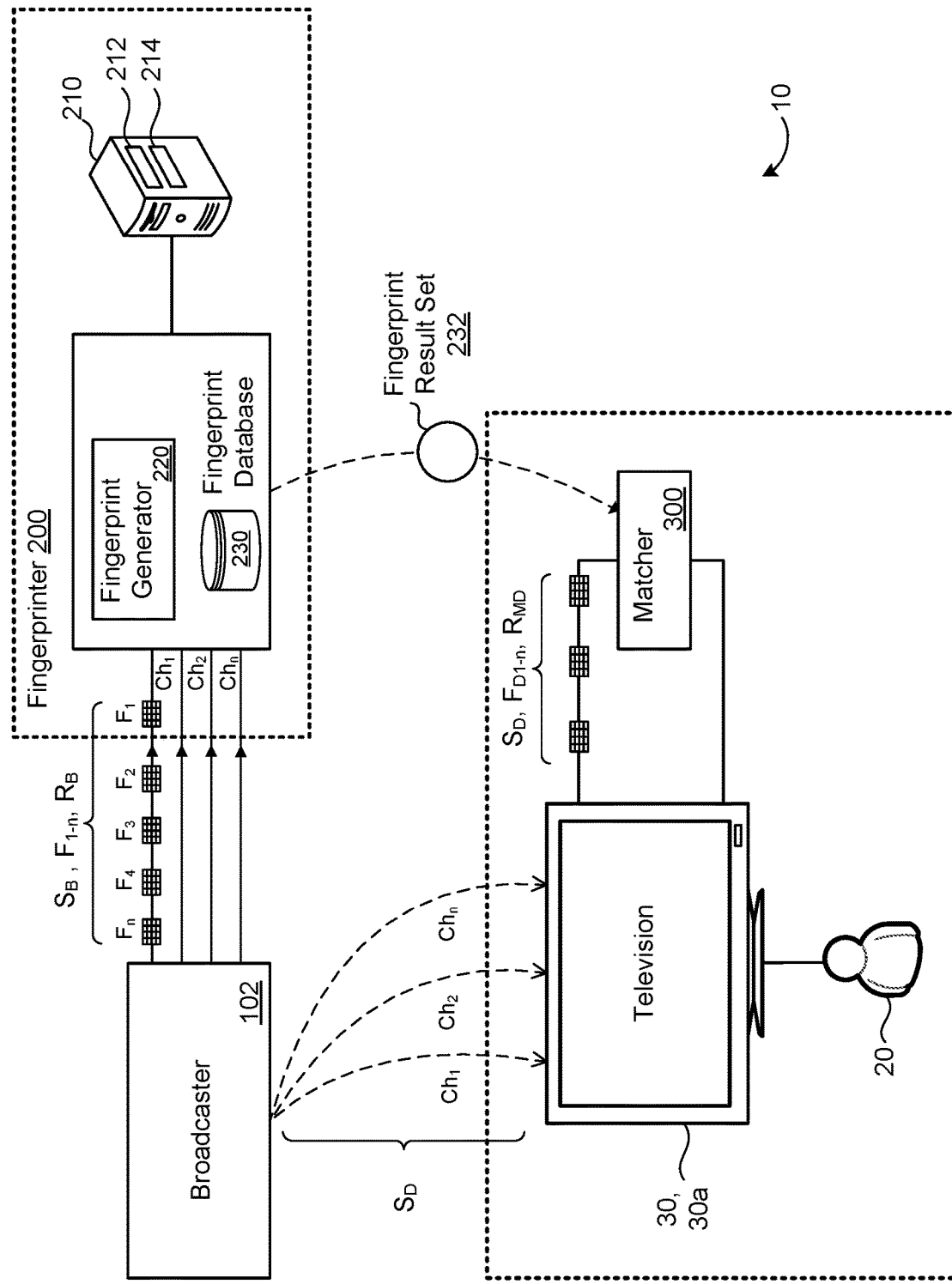

FIG. 1B is an example of an ACR environment 10. The ACR environment 10 includes a broadcaster 102, a fingerprinter 200, and a matcher 300 (which may be part of the ACR module 132). The broadcaster 102 broadcasts the broadcast media stream $S_B$, $S_C$ by channels $Ch_{1-n}$ to the fingerprinter 200 at a broadcast frame rate $R_B$. The broadcast frame rate $R_B$ divides the broadcast media stream $S_B$, $S_C$ into broadcast frames $F_{1-n}$ such that each broadcast frame $F_{1-n}$ corresponds to an audio visual image represented by pixels within the broadcast media stream $S_B$. The fingerprinter 200 is configured to receive each broadcast frame $F_{1-n}$ at the broadcast fingerprint generator 220. The broadcast fingerprint generator 220 receives each broadcast frame $F_{1-n}$ and is configured to generate broadcast fingerprints 222, 222a indicative of each broadcast frame $F_{1-n}$. Generally, a broadcast fingerprint 222, 222a is at least one unique identifier corresponding to at least one broadcast frame $F_{1-n}$. The fingerprinter 200 may store each broadcast fingerprint 222, 222a in a database, such as the fingerprint database 230. In some examples, the fingerprinter 200 stores each broadcast fingerprint 222, 222a according to or along with metadata 224 corresponding to the broadcast frame $F_{1-n}$, such as a frame location (e.g., a frame time code), a type of frame (e.g., live program or advertisement), or a fingerprint identifier tag. In other examples, the fingerprinter 200 has a separate database or databases corresponding to the metadata 224 of each broadcast fingerprints 222, 222a. A separate database for metadata 224 may allow the fingerprinter 200 to store more broadcast fingerprints 222, 222a.

Referring further to FIG. 1B, the broadcaster 102 also broadcasts the broadcast media stream $S_B$, $S_C$ to the media device 30. The media device 30 receives the broadcast media stream $S_B$, $S_C$ from the broadcaster 102 as a media device stream $S_D$. The media device 30 is configured to capture media frames $F_{D1-n}$ from the media device stream $S_B$ and to communicate the captured media frames $F_{D1-n}$ to the matcher 300. In the example shown in FIG. 1B, the media device 30 is a television 30, 30a (TV) that receives the media device stream $S_D$. For example, the television 30, 30a receives television channels $Ch_{1-n}$ as the media device stream $S_D$. Other types of media devices 30 are possible as well.

In some implementations, the broadcaster 102 provides the broadcast media stream $S_B$, $S_C$ at the broadcast frame rate $R_B$. The media device 30 (e.g., depicted as the TV 30, 30a) may receive the broadcast media stream $S_B$, $S_C$ at the corresponding broadcast frame rate $R_B$ as the media device stream $S_D$. Often, the broadcast frame rate $R_B$ corresponds to various industry standards of a broadcast format (e.g., 1080 60i, 720 60P, etc.). For example, some common broadcast frame rates $R_B$ include 30P (29.97 frames per second), 24P, (23.98 frames per second), and 60P (59.94 frames per second). The media device 30 may be configured to capture frames $F_{D1-n}$ of the media device stream $S_D$ at a media device frame rate $R_{MD}$. The media device frame rate $R_{MD}$ is the frame rate that a corresponding media device 30 provides captured frames $F_{D1-n}$ to the matcher 300. In some implementations, the media device 30 is configured to receive the media device stream $S_D$ at the broadcast frame rate $R_B$, but yet is configured to capture frames $F_{D1-n}$ of the media device stream $S_D$ at a media device frame rate $R_{MD}$ for the matcher 300. For example, the broadcast frame rate $R_B$ is different than the media device frame rate $R_{MD}$. An example of this difference is that the broadcast frame rate $R_B$ is greater than the media device frame rate $R_{MD}$ (e.g., a broadcast frame rate of 30P and a media device frame rate $R_{MD}$ of 4 frames per second). The difference in frame rates may be due to resource limitations (CPU, memory, etc.) relating to frame capturing hardware or software at the media device 30.

In some examples, the matcher 300 receives a fingerprint result set 232 and the media device frames $F_{D1-n}$ from the media device stream $S_D$. The fingerprint result set 232 corresponds to a sequence of broadcast fingerprints 222, 222a captured at the fingerprinter 200 and communicated to the matcher 300. An advantage of the fingerprint result set 232 is that the fingerprinter 200 and matcher 300 may communicate portions of all broadcast fingerprints 222, 222a generated by the fingerprinter 200 instead of all broadcast fingerprints 222, 222a. As a portion of the broadcast fingerprints 222, 222a of the fingerprint database 230, the fingerprint results set 232 may be a data size that permits the matcher 300 to more efficiently process. The matcher 300 may compare the media device frames $F_{D1-n}$ to the broadcast frames $F_{1-n}$ to identify matching frames $F_n$, $F_{Dn}$. The matcher 300 may be an internal device to the television 30, 30a (e.g., hardware or software of the television 30, 30a) or an external device in communication with the television 30, 30a (e.g., a headend system or a set top box). In some implementations, the fingerprint result set 232 corresponds to a set amount of sequential broadcast fingerprints 222, 222a. For example, the fingerprint result set 232 includes sequential broadcast fingerprints 222, 222a corresponding to five minutes of broadcast frames $F_{1-n}$. In other words, at a broadcast frame rate $R_B$ of thirty frames per second, the fingerprint result set 232 includes 9,000 sequential broadcast fingerprints 222, 222a corresponding to 9,000 sequential broadcast frames $F_{1-9000}$ during a five minute span.

Figure 2:
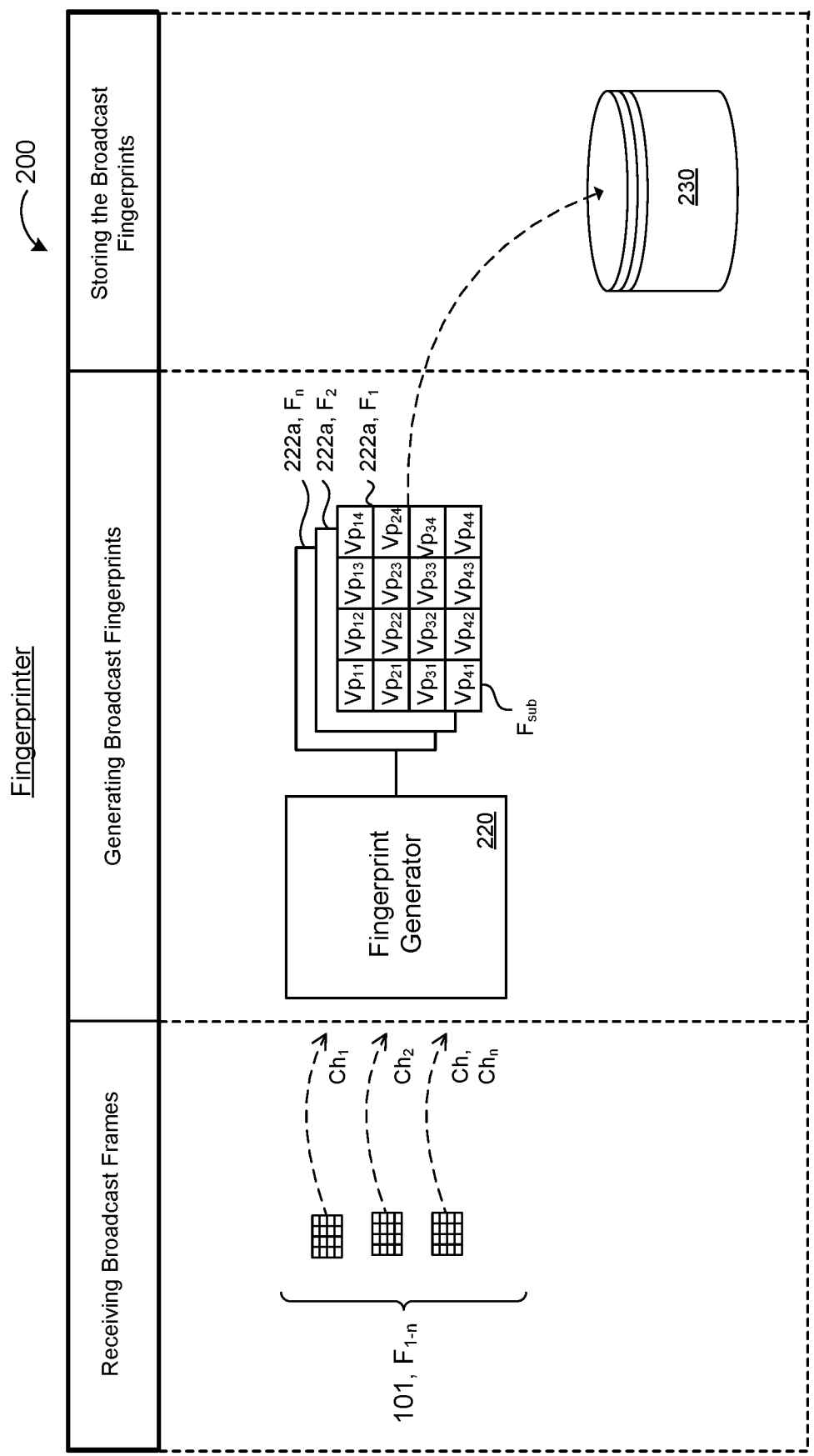
FIG. 2 is a schematic view of an example server of the automatic content recognition environment.

FIG. 2 is an example of the broadcast fingerprint generator 220 of the fingerprinter 200. The broadcast fingerprint generator 220 receives the broadcast frames Fin corresponding to channels Chin of the broadcast media stream $S_B$, $S_C$. The broadcast fingerprint generator 220 may generate a broadcast fingerprint 222, 222a for each received broadcast frame $F_{1-n}$ and may store the broadcast fingerprint 222, 222a in the fingerprint database 230. In some examples, each broadcast fingerprint 222, 222a represents at least one pixel value $V_P$ of the broadcast frame $F_{1-n}$ of the corresponding broadcast media stream $S_B$. The at least one pixel value $V_P$ may be an average pixel value or a sum of color space values of the broadcast frame $F_{1-n}$. For example, the at least one pixel value $V_P$ may represent a sum and/or average of grayscale values of a corresponding broadcast frame $F_{1-n}$ when the broadcast fingerprint generator 220 generates a broadcast fingerprint 222, 222a according to a gray-UV (YUV) color space. In other words, each pixel of the corresponding broadcast frame $F_{1-n}$ is represented by a grayscale value such that the broadcast fingerprint 222, 222a represents the sum and/or average of the grayscale values of a pixel area. In some implementations, the fingerprint 222 (e.g., the broadcast fingerprint 222, 222a) is a unique identifier based on sub-frames $F_{sub}$ of the corresponding broadcast frame $F_{1-n}$. Depending on the pixels per sub-frame $F_{sub}$, each sub-frame $F_{sub}$ may have a corresponding pixel value $V_p$ or a corresponding average pixel value.

Generally, fingerprints 222 may be a source of inaccuracy within the ACR environment 10. The inaccuracy arises because consecutive media device frames $F_{D1-n}$ and consecutive broadcast frames $F_{1-n}$ may be very similar, such that consecutive frames only have slight changes over time unless a scene change occurs drastically changing consecutive frames. Due to only slight changes typically between consecutive frames $F_{D1-n}$, a fingerprint 222 based on one or a small number of pixel values $V_P$ may be very similar to a consecutive fingerprint 222 based on the same number of pixels. Therefore, the matching process between fingerprints 222 within the ACR environment 10 may lead to potential matching error (e.g., a false match). In other words, the matcher 300 may determine that the media device stream $S_D$ is being viewed by the user 20 at one media device frame $F_{D1-n}$ (a match media device frame $F_{MD}$) even though the user 20 is actually viewing media content from the media device stream $S_D$ a few media device frames $F_{D1-n}$ ahead of or behind the match media device frame $F_{MD}$.

FIG. 2 also illustrates an example of a broadcast fingerprint 222a, $F_{1-n}$ corresponding to a broadcast frame $F_{1-n}$ divided into sub-frames $F_{sub}$. In some examples, the broadcast fingerprint generator 220 may divide each broadcast frame $F_{1-n}$ into sub-frames $F_{sub}$ to more accurately compare or to distinguish between broadcast frames $F_{1-n}$. With sub-frames $F_{sub}$, each fingerprint 222 may represent more than one average pixel value $V_p$ of the corresponding frame $F_{1-n}$. By dividing each broadcast frame $F_{1-n}$ into sub-frames $F_{sub}$, more details (e.g., pixels of each sub-frame $F_{sub}$) are taken into account during broadcast fingerprint generation than broadcast fingerprints 222, 222a based on a pixel value $V_P$ (or average pixel value) of an entire broadcast frame $F_{1-n}$. As such, the number of sub-frames $F_{sub}$ that the broadcast fingerprint generator 220 divides each broadcast frame $F_{1-n}$ into depends on a desired level of accuracy. For example, as shown in FIG. 2, the broadcast fingerprint generator 220 divides each broadcast frame $F_{1-n}$ into sixteen sub-frames $F_{sub}$ defining a four by four array. Each sub-frame $F_{sub}$ of the sixteen sub-frames $F_{sub}$ has an average pixel value $V_{p11-44}$ such that each broadcast fingerprint 222a represents each corresponding broadcast frame $F_{1-n}$ by a sixteen value integer vector having an integer value associated with each sub-frame $F_{sub}$. Although the figures may depict each broadcast frame $F_{1-n}$ or each media device frame $F_{D1-n}$ as a four by four array, any sub-frame division is possible.

Generally speaking, ACR can be divided into two stages, cold matching and hot matching. Cold matching typically refers to the first stage (or identification stage) of ACR. During the identification stage, ACR first identifies the channel that the user 20 is watching and where in the channel the user 20 is currently watching. Once ACR completes the identification stage, ACR monitors the media device stream $S_D$ of the user 20 for updates or changes to the channel that the user 20 is watching. Hot matching generally refers to this second stage or monitoring stage of ACR. Although cold matching is often performed between the network layer 120 and the device layer 130 and hot matching is performed at the device layer 130, connectivity between layers coupled with ACR hardware and/or software may enable any layer or any combination of layers within the ACR environment 10 to communicate and store information to perform cold matching and/or hot matching.

Figure 3A:
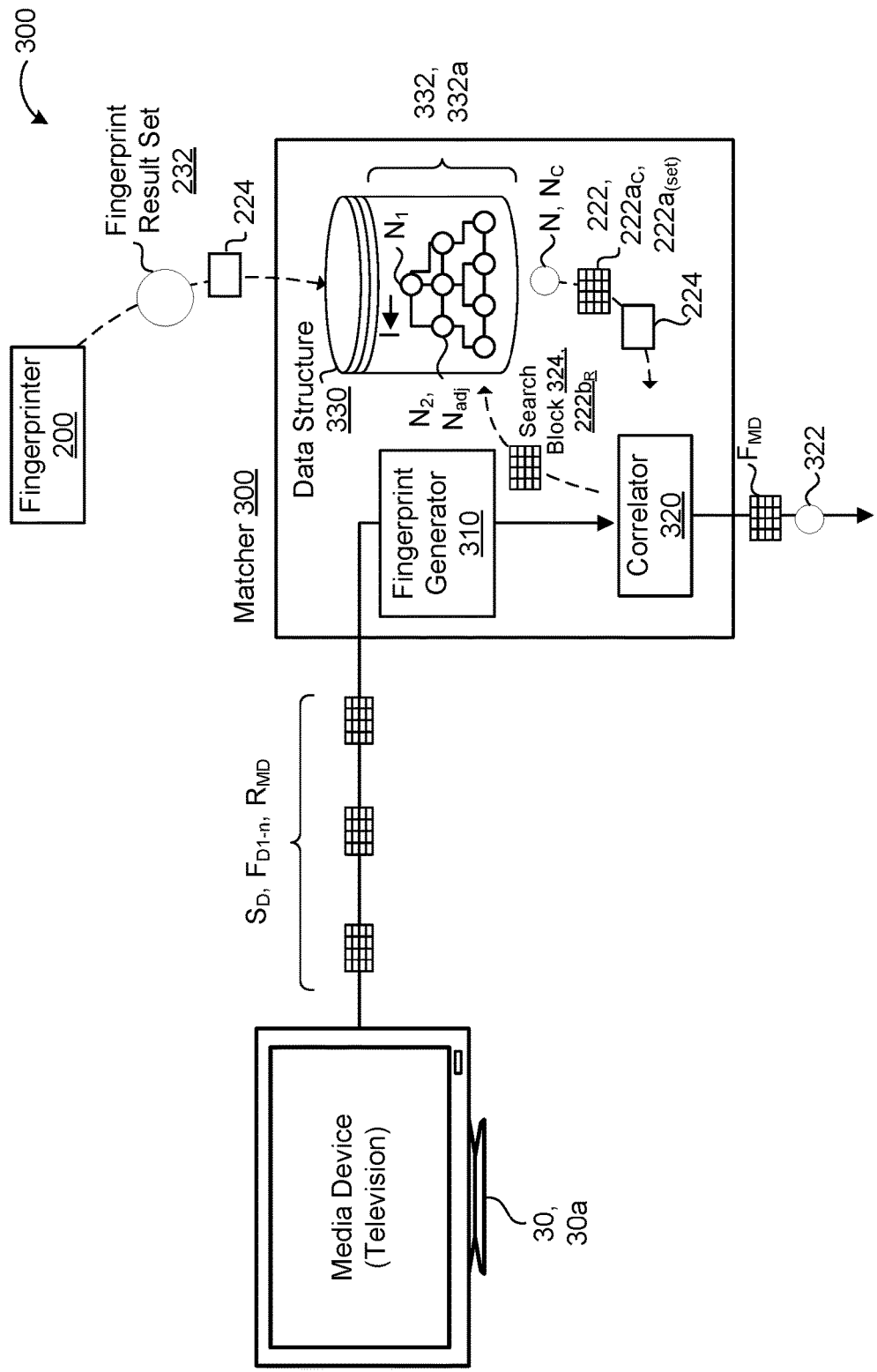
FIGS. 3A-3C are perspective views of example matchers corresponding to a media device.
Figure 3B:
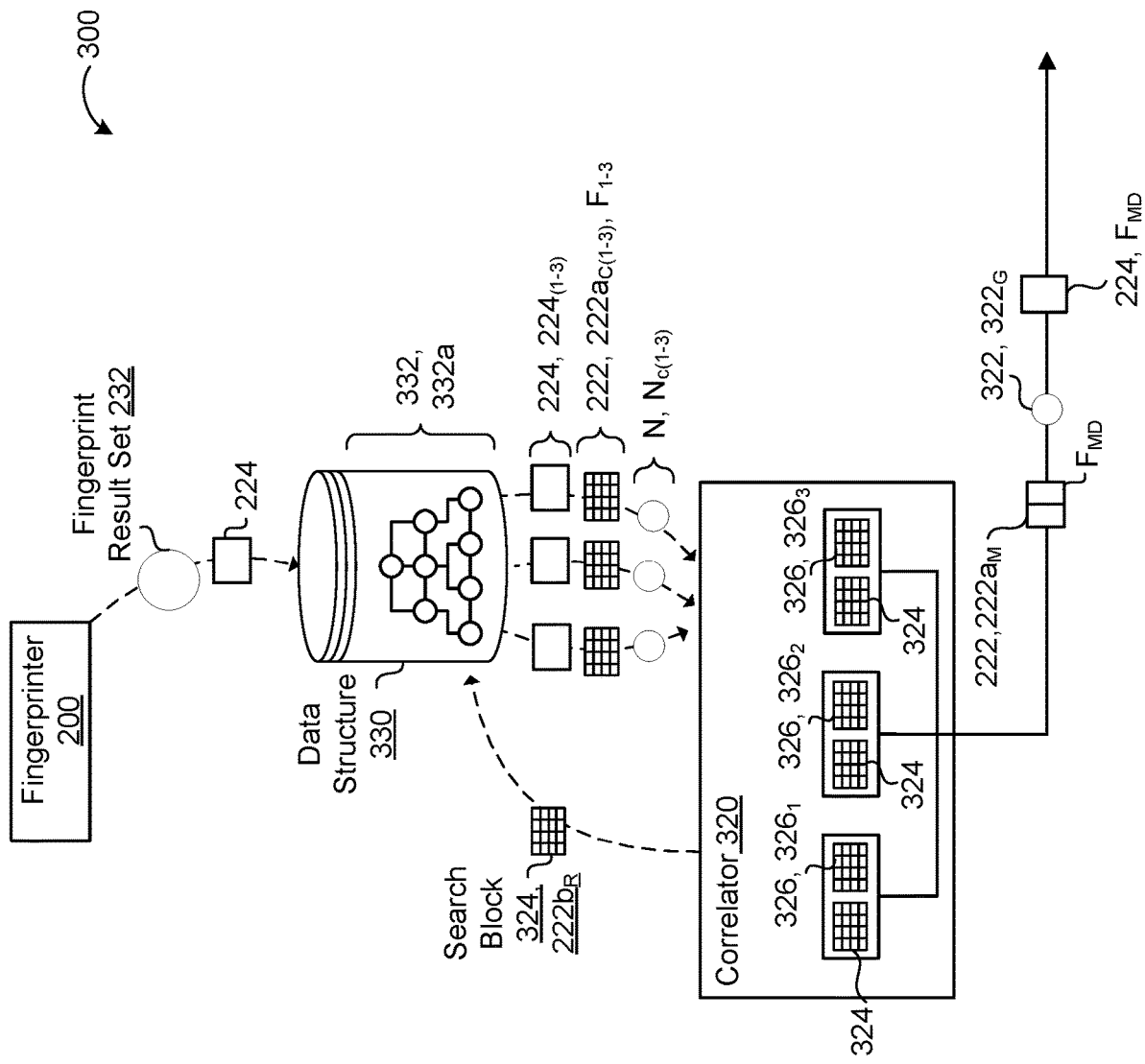

FIGS. 3A and 3B are examples of the matcher 300 of the media device 30 (e.g., the television 30, 30a). The matcher 300 receives media device frames $F_{D1-n}$ captured from a media device stream $S_D$. In some configurations, the matcher 300 receives captured media device frames $F_{D1-n}$ as a set of sequential media device frames $F_{D1-n}$. The matcher 300 may receive media device frames $F_{D1-n}$ at a media device frame rate $R_{MD}$. The media device frame rate $R_{MD}$ may be similar to the broadcast frame rate $R_B$ or different from the broadcast frame rate $R_B$. Additionally or alternatively, the matcher 300 receives captured media device frames $F_{D1-n}$ in a non-uniform manner (e.g., not a uniform frame capture rate). As an example, the matcher 300 receives captured media device frames $F_{D1-n}$ upon request or selective communication with the media device 30. In other examples, timing delays or communication lags between the matcher 300 and the media device 30 cause non-uniform receipt of captured media device frames $F_{D1-n}$ at the matcher 300 or receipt of non-sequential captured media device frames $F_{D1-n}$.

Typically, the matcher 300 includes a matcher fingerprint generator 310 and a correlator 320. The matcher fingerprint generator 310 is configured to generate media device fingerprints 222, 222b based on the received media device frames $F_{D1-n}$. The media device fingerprints 222, 222b are fingerprints 222 that correspond to each media device frame $F_{D1-n}$ received at the matcher 300 from the media device 30 (e.g., the television 30, 30a). The media device fingerprints 222, 222b may represent each media device frame $F_{D1-n}$ as a unique identifier in a representation much like the broadcast fingerprints 222, 222a. Each media device fingerprint 222, 222b represents each corresponding media device frame $F_{D1-n}$ by a value or unique identifier such that the correlator 320 of the matcher 300 may compare the broadcast fingerprints 222, 222a to the media device fingerprints 222, 222b. For example, the matcher fingerprint generator 310 may generate media device fingerprints 222, 222b representing at least one pixel value $V_p$ of the media device frame $F_{D1-n}$ of the corresponding media device stream $S_D$. The at least one pixel value $V_p$ may correspond to sub-frames $F_{sub}$ of each media device frame $F_{D1-n}$ (e.g., sixteen sub-frames $F_{sub}$ defining a four by four array) such that, in some implementations, the media device fingerprint 222, 222b is a vector of values corresponding to at least one pixel value $V_p$ of each sub-frame $F_{sub}$.

Referring further to FIGS. 3A and 3B, the matcher 300 includes the correlator 320 that determines a match correlation 322 between frames F and/or fingerprints 222 corresponding to frames F. In some examples, the correlator 320 determines the match correlation 322 between at least one media device fingerprint 222, 222b and at least one broadcast fingerprint 222, 222a. When the correlator 320 identifies the match correlation 322, the matcher 300 identifies the at least one media device frame $F_{D1-n}$ corresponding to the match correlation 322 as a match media device frame $F_{DM}$. For example, when the correlator 320 identifies the at least one media device fingerprint 222, 222b as having the match correlation 322 to the at least one broadcast fingerprint 222, 222a, the matcher 300 identifies the at least one media device fingerprint 222, 222b as corresponding to the match media device frame $F_{DM}$. The matcher 300 may associate the match media device frame $F_{DM}$ with metadata 224 (e.g., frame data) including a frame number and an associated broadcast channel. For example, the matcher 300 receives metadata 224 corresponding to the at least one broadcast fingerprint 222, 222a of the match correlation 322. By identifying the match media device frame $F_{DM}$, the matcher 300 associates metadata 224 corresponding to the at least one broadcast fingerprint 222, 222a of the match correlation 322 with the match media device frame $F_{DM}$. In other words, the match correlation 322 means that the at least one media device frame $F_{D1-n}$ corresponding to the at least one media device fingerprint 222, 222b of the match correlation 322 should have metadata 224 similar to or identical to the at least one broadcast frame $F_{1-n}$ corresponding to the at least one broadcast fingerprint 222, 222a of the match correlation 322.

The match correlation 322 is a value that is representative of a similarity (i.e. strength of association). In some examples, the match correlation 322 is a statistical correlation. Statistical correlations are generally two variable (i.e. bivariate) relationships that range from negative one to one where zero represents a lack of relationship, negative values represent an inverse relationship, and positive values represent a proportional relationship. The negative one to one range may represent the strength of association where a value closer to zero represents a weak correlation and a value close to one (i.e. a perfect correlation) represents a strong correlation. Although the negative one to one range represents a simple statistical correlation range, the range may be scaled depending on system design. Preferably, the match correlation 322 is based on a Pearson correlation coefficient where the Pearson correlation coefficient is generally a covariance of two variables divided by a product of a standard deviation of the two variables. Yet even though the Pearson correlation coefficient is preferred for the match correlation 322, the match correlation 322 may be based on any correlation coefficient. Examples of other statistical correlations coefficients include a Kendall rank correlation or a Spearman correlation.

In some examples, the correlator 320 determines the match correlation 322 by compiling a search block 324. The search block 324 may include at least one media device fingerprint 222, 222b or a plurality of media device fingerprints 222, 222b. In some examples, the media device fingerprints 222, 222b of the search block 324 correspond to sequential media device frames $F_{Dn+1}$, $F_{D1-n}$ captured from the media device stream $S_D$. The correlator 320 receives the at least one media device fingerprint 222, 222b of the search block 324 from the matcher fingerprint generator 310 or alternatively from a database of media device fingerprints 222, 222b either within the matcher 300 or communicating with the matcher 300.

In some implementations, the correlator 320 is capable of correlating the search block 324 to the fingerprint database 230. Yet, in these implementations, the size of the fingerprint database 230 may slow real-time advantages of an ACR process. Therefore, instead of slowing these real-time advantages, the correlator 320 may determine the match correlation 322 according to broadcasts fingerprints 222, 222a of the fingerprint result set 232. For example, the sequential broadcast frames $F_{1-n}$ of the fingerprint result set 232 corresponds to a first period of time $t_1$ of the broadcast media stream $S_B$, while the search block 324 corresponds to a second period of time $t_2$ of the media device stream $S_D$ such that the first period of time $t_1$ is greater than the second period of time $t_2$. With the first period of time $t_1$ greater than the second period of time $t_2$, the ACR environment 10 may ensure the matcher 300 may identify at least one media device fingerprint 222, 222b having the match correlation 322 to the at least one broadcast fingerprint 222, 222a while maintaining real-time processing speeds.

In some configurations, the search block 324 includes, as the at least one media device fingerprint 222, 222b, a most recent media device fingerprint 222, $222b_R$ corresponding to a most recent media device frame $F_{D1-n}$ captured at the media device 30, (e.g., the television 30, 30a). By including the most recent media device fingerprint 222, $222b_R$ within the search block 324, the matcher 300 may determine frame data (e.g., metadata 224) most contemporaneous to media content viewing by the user 20. In other words, the matcher 300 may associate metadata 224 corresponding to the at least one broadcast fingerprint 222, 222a of the match correlation 322 with the at least one media device frame corresponding to the most recent media device fingerprint 222, 222b of the match correlation 322. Thus, the matcher 300 may identify an associated broadcast channel along with a frame location (e.g., a frame number associated with a position) within the broadcast channel.

In some examples, the matcher 300 includes a data structure 330 representing a plurality of broadcast fingerprints 222, 222a (e.g., the fingerprint result set 232). The data structure 330 permits the correlator 320 to compare media device fingerprints 222, 222b (e.g., the search block 324) to broadcast fingerprints 222, 222a. Additionally or alternatively, the data structure 330 enables the correlator 320 to perform a multi-stage correlation process of determining the match correlation 322. The multi-stage correlation process may include a candidate identification process and a match correlation process. In the candidate identification process, the correlator 320 may identify broadcast fingerprints 222, 222a from the data structure 330 as candidate broadcast fingerprints 222, $222a_c$ for the match correlation 322. Generally, a candidate broadcast fingerprint 222, $222a_c$ is a broadcast fingerprint 222, 222a corresponding to a broadcast frame $F_{1-n}$ that may match at least one media device fingerprint 222, 222b (e.g., the most recent media device fingerprint 222, $222b_R$). In examples where the correlator 320 compiles the search block 324, the candidate broadcast fingerprint 222, $222a_c$ is a broadcast fingerprint 222, 222a corresponding to a broadcast frame $F_{1-n}$ that may match at least one media device fingerprint 222, 222b of the search block 324. By identifying at least one candidate broadcast fingerprint 222, $222a_c$ for the match correlation 322, the matcher 300 may reduce processing time at the correlator 320 during the match correlation process because the correlator 320 may perform the match correlation 322 with less broadcast fingerprints 222, 222a (e.g., the identified candidate broadcast fingerprints 222, $222a_c$). In other words, in a single stage correlation process, the correlator 320 may perform the match correlation 322 with broadcast fingerprints 222, 222a of the fingerprint result set 232 and/or the data structure 330 rather than merely identified candidate broadcast fingerprints 222, $222a_c$. In the match correlation process, the correlator 320 may receive the at least one candidate broadcast fingerprint 222, $222a_c$ and may determine the match correlation 322 based on the at least one candidate broadcast fingerprint 222, $222a_c$.

In some implementations, the data structure 330 represents the plurality of broadcast fingerprints 222, 222a by nodes N. Each node $N_{(1-n)}$ may constitute a broadcast fingerprint 222, 222a corresponding to a broadcast frame $F_{1-n}$. With nodes N, the correlator 320 may search the data structure 330 and identify at least one candidate node N, $N_c$ corresponding to a candidate broadcast fingerprint 222, $222a_c$. Each node $N_{(1-n)}$ may also include metadata 224 (e.g., a frame location, a type of frame, or a fingerprint identifier tag) or may include a reference to metadata 224. The matcher 300 may associate metadata 224 or the reference to metadata 224 with each candidate broadcast fingerprint 222, $222a_c$. In other words, after searching the data structure 330, the matcher 300 and/or the correlator 320 may receive at least one candidate node N, $N_c$ indicating at least one candidate broadcast fingerprint 222, $222a_c$ for the match correlation 322 along with metadata 224 relating to the broadcast frame $F_{1-n}$ of the at least one candidate broadcast fingerprint 222, $222a_c$ received as the at least one candidate node N, $N_c$.

In some examples, each node $N_{(1-n)}$ references a sequential array of broadcast frames $F_{1-n}$ (e.g., broadcast frames $F_{1-n}$ related to the fingerprint result set 232) such that when the correlator 320 determines at least one candidate broadcast fingerprint 222, $222a_c$ (e.g., by a candidate node N, NO the correlator 320 may also identify a frame location corresponding to the at least one candidate broadcast fingerprint 222, $222a_c$. The sequential array of broadcast frames $F_{1-n}$ may enable the matcher 300 to select a set of broadcast fingerprints 222, $222a_{set}$ corresponding to a set of broadcast frames $F_{1-n(set)}$ to compare with the search block 324 as a match correlation block 326 (e.g., shown in FIG. 3B). The set of broadcast fingerprints 222, $222a_{set}$ selected by the matcher 300 often includes the at least one candidate broadcast fingerprint 222, $222a_c$ identified during the candidate identification process along with a selected number of broadcast fingerprints 222, 222a sequentially adjacent (e.g., proceeding or subsequent to) to the at least one candidate broadcast fingerprint 222, $222a_c$ identified during the candidate identification process. The number of broadcast fingerprints 222, 222a within the set of broadcast fingerprints 222, $222a_{set}$ may correspond to the media device fingerprints 222, 222b of the search block 324 such that the correlator 320 may perform the match correlation 322 by comparing an equal number of broadcast fingerprints 222, 222a to an equal number of media device fingerprints 22, 222b.

During a multi-stage correlation process, the correlator 320 may perform searches, such as a range search or a nearest neighbor search, of the data structure 330 to identify the at least one candidate broadcast fingerprint 222, $222a_c$. In some examples, when the correlator 320 performs searches, the correlator 320 searches the data structure 330 using a search metric such as a distance (e.g., a Euclidean distance, a Manhattan distance, etc.). FIG. 3A illustrates an example of a nearest neighbor search. Typically, nearest neighbor searches are proximity searches such that a nearest neighbor search provides an output most similar in proximity to an input. For example, given a set S of points in a space N and an input point P, a nearest neighbor search returns a point closest to input point P in the set S within space N. In some examples, such as FIG. 3A, the correlator 320 performs a nearest neighbor search using Euclidean distance as the search metric. FIG. 3A depicts the input of the candidate identification process as the at least one media device fingerprint 222, 222b (e.g., the most recent media device fingerprint 222, $222b_R$) of the search block 324. In these examples, the correlator 320 determines the distance between the at least one media device fingerprint 222, 222b of the search block 324 and each node N within the data structure 330. As a result of a nearest neighbor search, the correlator 320 may identify a broadcast fingerprint 222, 222a of a node N corresponding to a minimum of each distance determined by the correlator 320 as a candidate broadcast fingerprint 222, $222a_c$.

FIG. 3B is an example that the correlator 320 may identify multiple candidate broadcast fingerprints 222, $222a_c$. In some implementations, the correlator 320 identifies multiple candidate broadcast fingerprints 222, $222a_c$ using a range search. Generally, a range search is a search that, based on an input, provides an output or outputs within a given range. For instance, given a set S of points in a space N, an input point P, and an input range R, a range search may return all points related to the input point P within the set S that satisfies the input range R. In some examples, a range search identifies a set of outputs that correspond to a proximity range. When the correlator 320 performs a range search according to a predetermined proximity range, the correlator 320 may identify at least one broadcast fingerprint 222, 222a of a node N with a search metric within the predetermined proximity range as a candidate broadcast fingerprint 222, $222a_c$. As an example, the correlator 320 receives a proximity range that corresponds to a distance of 0-1.0 between the at least one media device frame 222, 222b and the broadcast frame 222, 222a of a node N. With the received proximity range of 0-1.0, the correlator 320 may determine the search metric (e.g., the distance) between the at least one media device frame 222, 222b (e.g., from the search block 324) and each node N of the data structure 330. In this example, the correlator 320 identifies each node N satisfying the proximity range 0-1.0 according to the search metric as a candidate broadcast fingerprint 222, 222$a_c$. In some implementations, such as FIG. 3B, the correlator 320 identifies three candidate nodes N, N$_{c(1-3)}$ corresponding to three candidate broadcast fingerprints 222, 222$a_{c(1-3)}$ as the at least one candidate broadcast fingerprint 222, 222$a_c$. Additionally or alternatively, as shown by FIG. 3B, the correlator 320 may receive or may retrieve metadata 224 corresponding to each candidate broadcast fingerprint 222, 222$a_c$ identified.

As shown in FIGS. 3A and 3B, the data structure 330 may be organized to optimize the candidate identification process. In some implementations, the data structure 330 is a tree data structure 332 (e.g., a binary search tree 332, 332$a$) of two or more dimensions, such as range tree or a k-d tree. A tree data structure 332 may enable the correlator 320 to perform searches of the data structure 330 without necessarily needing to determine the search metric between the at least one media device fingerprint 222, 222$b$ of the search block 324 and each node N within the data structure 330. Instead as shown in FIG. 3A, the data structure 330, such as a tree data structure 332, may provide correlator 320 with an indication I of an adjacent node N$_{adj}$ to search within the data structure 330. In some examples, the correlator 320 searches for a node N relating to minima or maxima of the search metric. In the case of distance, the correlator 320 searches for a node N relating to minima of the distance between a node N and the at least one media device fingerprint 222, 222$a$ of the search block 324. In this example, the data structure 330 is organized such that when the correlator 320 determines a first search metric related to a first node N$_1$, the correlator 320 identifies the indication I of the first search metric and determines a second search metric related to an adjacent second node N$_2$, N$_{adj}$ to the first node N$_1$ in a direction corresponding to the indication I. For example, at the first node N$_1$, the correlator 320 may determine a distance of 3.50 between a broadcast fingerprint 222, 222$a$ of the first node N$_1$ and the at least one media device fingerprint 222, 222$a$ of the search block 324. The distance of 3.50 may indicate that the correlator 320 next perform the second search metric at the second node N$_2$ at a left side of the first node N$_1$. In this example, the data structure 330 is organized such that moving leftward of the first node N$_1$ corresponds to reducing the distance between a broadcast fingerprint 222, 222$a$ of the second node N$_2$ and the at least one media device fingerprint 222, 222$a$ of the search block 324. Although FIGS. 3A and 3B illustrate two dimensional data structures 330, the data structure 330 may occur in two or more dimensions such that the directional indication I may also occur with respect to two or more dimensions. By indicating the subsequent adjacent node N$_{adj}$ to search, the organization of the data structure 330 may optimize the number of nodes N the correlator 320 searches within the data structure 330. Therefore, an inherent advantage of some data structures 330 is that these data structures 330 may reduce the processing time of the candidate identification process while potentially increasing an accuracy of the match correlation process. Accordingly, the data structure 330 allows an organized iterative correlation process to help identify the at least one candidate broadcast fingerprint 222, 222$a_c$.

In some examples, the correlator 320 may determine that the search block 324 includes at least one media device fingerprint 222, 222$b$ having the match correlation 322 to more than one broadcast fingerprint 222, 222$a$. For example, in the case of FIG. 3B, the correlator 320 identified in the candidate identification process more than one candidate broadcast fingerprint 222, 222$a_c$. When the search block 324 includes at least one media device fingerprint 222, 222$b$ having the match correlation 322 to more than one broadcast fingerprint 222, 222$a$ (e.g., more than one candidate broadcast fingerprint 222, 222$a_c$), the correlator 320 may perform the match correlation 322 with each candidate broadcast fingerprint 222, 222$a_c$. As an example, FIG. 3B depicts the correlator 320 determining the match correlation 322 between the search block 324 and each match correlation block 326. As a result of the match correlation 322 between the search block 324 and each match correlation block 326, the correlator 320 determines a match media device frame F$_{MD}$ as the media device frame FD corresponding to the media device fingerprint 222, 222$b$ of the at least one media device fingerprint 222, 222$b$ of the search block 324 that has the greatest match correlation 322, 322G with a match broadcast fingerprint 222, 222$a_M$ of the candidate broadcast fingerprints 222, 222$a_c$.

As an example, the matcher 300 receives five minutes of broadcast fingerprints 222, 222$a_{(1-9,000)}$ as the fingerprint result set 232 corresponding to 9,000 sequential broadcast frames F$_{1-9000}$. The matcher 300 may also receive metadata 224 associated with the broadcast fingerprints 222, 222$a_{(1-9,000)}$ or may later retrieve metadata 224 from the fingerprinter 200 when the matcher 300 identifies the match media device frame F. The correlator 320 receives media device fingerprints 222, 222$b$ corresponding to captured media device frames F$_{D1-n}$ from the media device stream S$_D$ from the matcher fingerprint generator 310. In this example, the correlator 320 receives sixty media device fingerprints 222, 222$b_{(1-60)}$ corresponding to two seconds (i.e. a frame rate R$_{MD}$ of thirty frames per second) of the media device stream S$_D$ captured at the TV 30, 30$a$. Here, these sixty media device fingerprints 222, 222$b_{(1-60)}$ become the search block 324. When this example is a single stage correlation process, the correlator 320 may determine that at least one media device fingerprint 222, 222$b$ (e.g., the most recent media device fingerprint 222, 222$b_R$) of the sixty media device fingerprints 222, 222$b_{(1-60)}$ has a match correlation 322 to at least one broadcast fingerprint 222, 222$a$ of the fingerprint result set 232. In the single stage correlation process, the corresponding media device frame FD of the at least one media device fingerprint 222, 222$b$ that has the match correlation 322 is the match media device frame F$_{MD}$. When this example is a multi-stage correlation process, the correlator 320 may compare the at least one media device fingerprint 222, 222$b$ (e.g., the most recent media device fingerprint 222, 222$b_R$) of the search block 324 to the data structure 330 and identify at least one node N with at least one corresponding candidate broadcast fingerprint 222, 222$a_c$. With the at least one candidate broadcast fingerprint 222, 222$a_c$, the correlator 320 may generate match correlation blocks 326 for each identified candidate broadcast fingerprint 222, 222$a_c$. Because, in this example, the search block 326 is sixty media device fingerprints 222, 222$b_{(1-60)}$, each match correlation block 326 is sixty broadcast fingerprints 222, 222$a_{(1-60)}$ including a candidate broadcast fingerprint 222, 222$a_c$. The correlator 320 may then determine that at least one media device fingerprint 222, 222$b$ (e.g., the most recent media device fingerprint 222, 222$b_R$) of the search block 324 has a match correlation 322 to at least one broadcast fingerprint 222, 222$a$ of a match correlation block 326. Similar to a single stage correlation process, the corresponding media device frame FD of the at least one media device fingerprint 222, 222$b$ that has the match correlation 322 is the match media device frame F$_{MD}$.

Figure 3C:
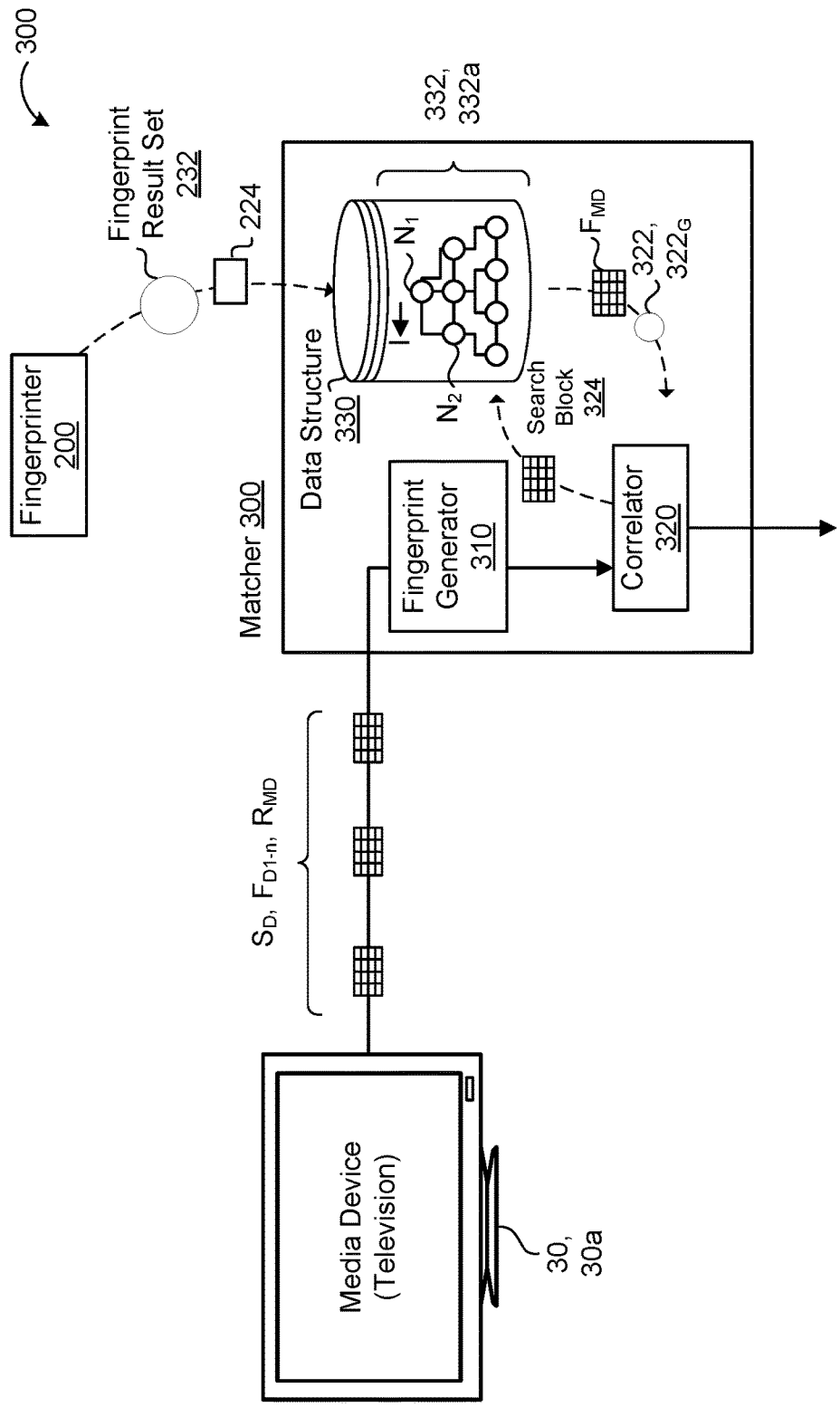

Optionally, FIG. 3C depicts that the correlator 320 may use the data structure 330 to perform an iterative match correlation process without a candidate identification process. As an example, the correlator 320 determines the match correlation 322 between at least one media device fingerprint 222, 222b of the search block 324 and a first node $N_1$ corresponding to at least one broadcast fingerprint 222, 222a. With the match correlation 322 at the first node $N_1$, the match correlation 322 provides indication I of a second node $N_2$ that is a neighbor to the first node $N_1$ that may further optimize the match correlation 322. For example, at the first node $N_1$ the correlator 320 may determine the match correlation 322 is a value of 0.55. The value of 0.55 represents a moderate proportional association indicating that the correlator 320 next perform a second match correlation 322, 322b with a second node $N_2$ at a left side of the first node $N_1$. In this example, moving to the leftward of the first node $N_1$ may correspond to increasing proportional strength of association for the match correlation 322. Therefore, the data structure 330 allows an organized iterative correlation process to help return the greatest match correlation 322, 322G.

Figure 4:
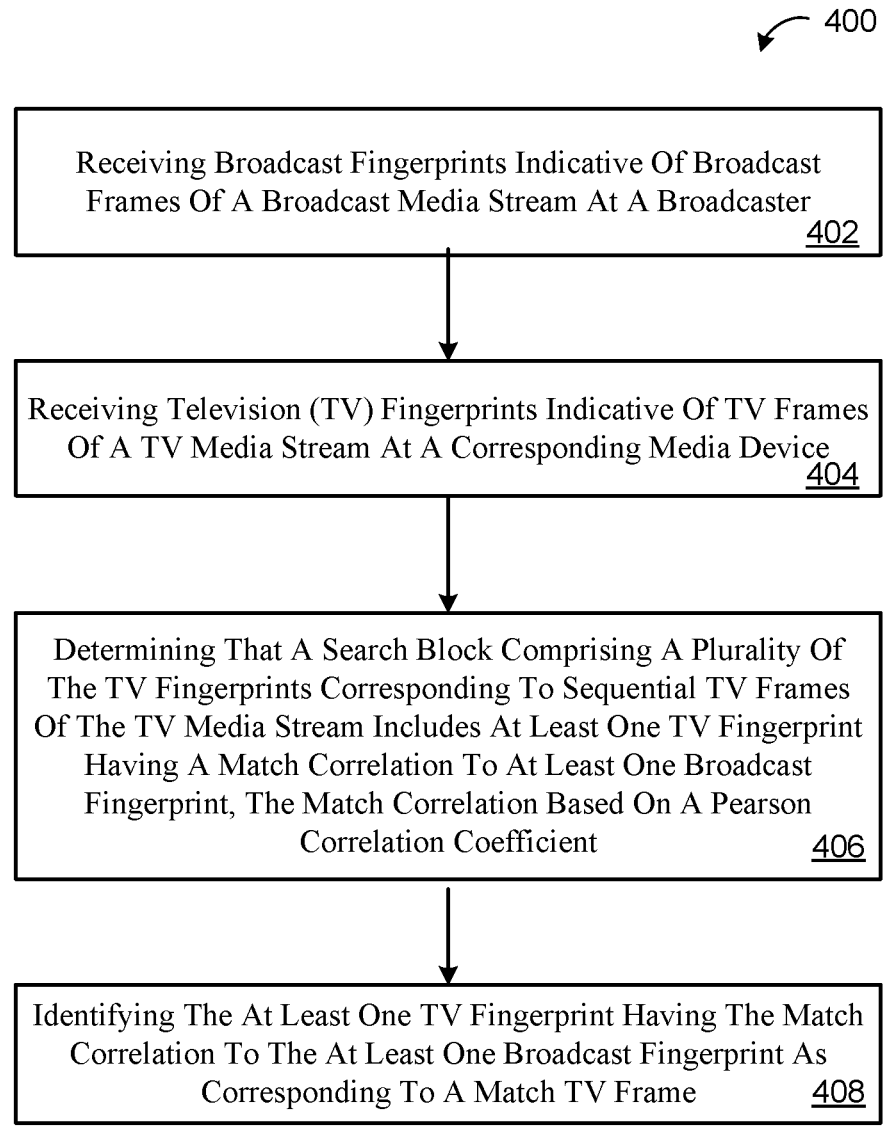
FIG. 4 is a flow diagram for an example arrangement of operations executable by an automatic content recognition routine.

FIG. 4 is a method 400 for cold matching during automatic content recognition. At block 402, the method 400 includes receiving, at data processing hardware, broadcast fingerprints indicative of broadcast frames of a broadcast media stream at a broadcaster. At block 404, the method 400 further includes receiving, at the data processing hardware, media device fingerprints indicative of media device frames of a media device stream at a corresponding media device. At block 406, the method 400 also includes determining, by the data processing hardware, that a search block comprising a plurality of the media device fingerprints corresponding to sequential media device frames of the media device stream includes at least one media device fingerprint having a match correlation to at least one broadcast fingerprint where the match correlation based on a Pearson correlation coefficient. At block 408, the method 400 also includes identifying, by the data processing hardware, the at least one media device fingerprint having the match correlation to the at least one broadcast fingerprint as corresponding to a match media device frame.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 5:
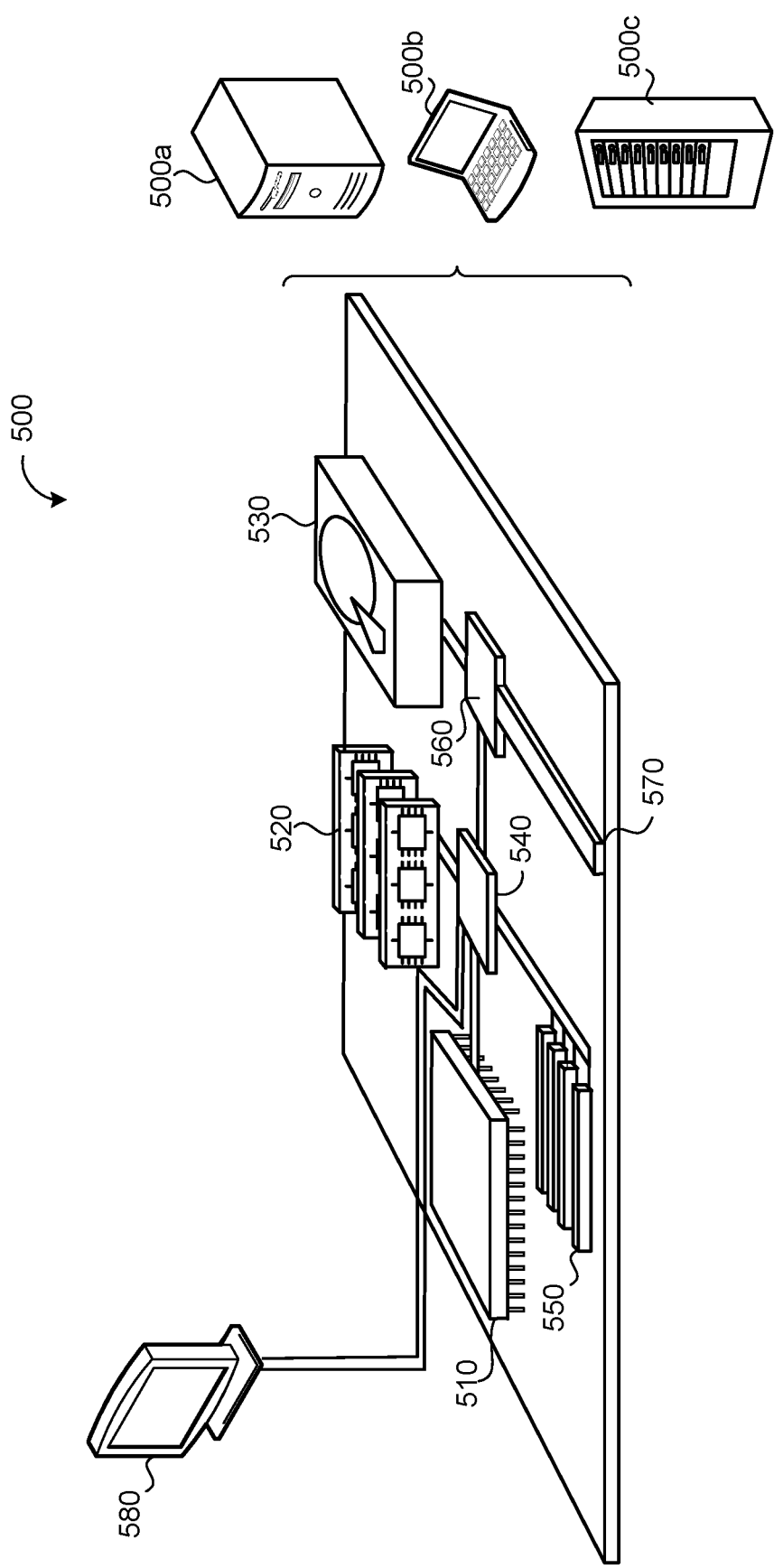
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method of identifying media provided for viewing at a media device, the method comprising:

receiving, at data processing hardware, broadcast fingerprints indicative of sequential broadcast frames of a broadcast media stream, the sequential broadcast frames corresponding to a first time period of the broadcast media stream;

compiling, by the data processing hardware, a search block of media device fingerprints indicative of sequential media device frames of a media device stream provided for viewing at the media device, the sequential media device frames of the search block corresponding to a second time period of the media device stream, the second time period being shorter than the first time period;

comparing, by the data processing hardware, (i) the search block of the media device fingerprints indicative of the sequential media device frames corresponding with the second time period of the media device stream with (ii) the broadcast fingerprints indicative of the sequential broadcast frames corresponding to the first time period of the broadcast media stream;

establishing, by the data processing hardware, based on the comparing, a match correlation between at least one media device fingerprint of the search block and at least one of the broadcast fingerprints, wherein the at least one media device fingerprint corresponds with at least one of the media device frames, and wherein the at least one broadcast fingerprint corresponds with at least one of the broadcast frames; and determining, by the data processing hardware, based on the established match correlation, that the at least one media device frame has metadata corresponding with the at least one broadcast frame, the metadata comprising a broadcast channel identification and frame location.

2. The method of claim 1, further comprising:

determining, by the data processing hardware, whether the search block includes at least one media device fingerprint having the match correlation to more than one broadcast fingerprint; and when the search block includes at least one media device fingerprint having the match correlation to more than one broadcast fingerprint, (i) determining, by the data processing hardware, a set of broadcast fingerprints corresponding to the at least one media device fingerprint of the search block, each broadcast fingerprint of the set of broadcast fingerprints being broadcast fingerprints of sequentially adjacent broadcast frames of the broadcast media stream and (ii) determining, by the data processing hardware, the match correlation as a Pearson correlation coefficient between the search block and the set of broadcast fingerprints.

3. The method of claim 2, further comprising determining, by the data processing hardware, a match media device frame as the media device frame corresponding to the media device fingerprint of the at least one media device fingerprint of the search block having the greatest Pearson correlation coefficient with a match broadcast fingerprint of the set of broadcast fingerprints.

4. The method of claim 1, wherein each fingerprint represents at least one pixel value of the frame of the corresponding media stream.

5. The method of claim 1, wherein each fingerprint is an average pixel value representing a sum of a grayscale value of a corresponding frame.

6. The method of claim 1, wherein each fingerprint represents more than one average pixel value of a sub-frame within a corresponding frame.

7. The method of claim 6, wherein each fingerprint of the corresponding frame is represented as a sixteen integer vector corresponding to each average pixel value of sixteen sub-frames, the sixteen sub-frames defining a four by four array of the corresponding frame.

8. The method of claim 1, wherein comparing the search block of the media device fingerprints with the broadcast fingerprints comprises comparing the search block to a database structure defined by a plurality of broadcast fingerprints wherein the database structure is a binary search tree.

9. A system comprising:
data processing hardware; and
memory hardware in communication with the data processing hardware, the memory hardware storing instructions that when executed on the data processing hardware cause the data processing hardware to perform operations including:
receiving broadcast fingerprints indicative of sequential broadcast frames of a broadcast media stream, the sequential broadcast frames corresponding to a first time period of the broadcast media stream,
compiling a search block of media device fingerprints indicative of sequential media device frames of a media device stream provided for viewing at a media device, the sequential media device frames of the search block corresponding to a second time period of the media device stream, the second time period being shorter than the first time period,
comparing (i) the search block of the media device fingerprints indicative of the sequential media device frames corresponding with the second time period of the media device stream with (ii) the broadcast fingerprints indicative of the sequential broadcast frames corresponding to the first time period of the broadcast media stream,
establishing, based on the comparing, a match correlation between at least one media device fingerprint of the search block and at least one of the broadcast fingerprints, wherein the at least one media device fingerprint corresponds with at least one of the media device frames, and wherein the at least one broadcast fingerprint corresponds with at least one of the broadcast frames, and
determining, based on the established match correlation, that the at least one media device frame has metadata corresponding with the at least one broadcast frame, the metadata comprising a broadcast channel identification and frame location.

10. The system of claim 9, wherein the operations further include:
determining whether the search block includes at least one media device fingerprint having the match correlation to more than one broadcast fingerprint, and
when the search block includes at least one media device fingerprint having the match correlation to more than one broadcast fingerprint, (i) determining a set of broadcast fingerprints corresponding to the at least one media device fingerprint of the search block, each broadcast fingerprint of the set of broadcast fingerprints being broadcast fingerprints of sequentially adjacent broadcast frames of the broadcast media stream and (ii) determining the match correlation as a Pearson correlation coefficient between the search block and the set of broadcast fingerprints.

11. The system of claim 10, wherein the operations further include determining a match media device frame as the media device frame corresponding to the media device fingerprint of the at least one media device fingerprint of the search block having the greatest Pearson correlation coefficient with a match broadcast fingerprint of the set of broadcast fingerprints.

12. The system of claim 9, wherein each fingerprint represents at least one pixel value of the frame of the corresponding media stream.

13. The system of claim 9, wherein each fingerprint represents more than one average pixel value of a sub-frame within a corresponding frame.

14. The system of claim 13, wherein each fingerprint of the corresponding frame is represented as a sixteen integer vector corresponding to each average pixel value of sixteen sub-frames, the sixteen sub-frames defining a four by four array of the corresponding frame.

15. The system of claim 9, wherein comparing the search block of the media device fingerprints with the broadcast fingerprints comprises comparing the search block to a database structure defined by a plurality of broadcast fingerprints wherein the database structure is a binary search tree.

16. A non-transitory memory storing program instructions executable by a processor to carry out operations including:
receiving broadcast fingerprints indicative of sequential broadcast frames of a broadcast media stream, the sequential broadcast frames corresponding to a first time period of the broadcast media stream,
compiling a search block of media device fingerprints indicative of sequential media device frames of a media device stream provided for viewing at a media device, the sequential media device frames of the search block corresponding to a second time period of the media device stream, the second time period being shorter than the first time period,
comparing (i) the search block of the media device fingerprints indicative of the sequential media device frames corresponding with the second time period of the media device stream with (ii) the broadcast fingerprints indicative of the sequential broadcast frames corresponding to the first time period of the broadcast media stream,
establishing, based on the comparing, a match correlation between at least one media device fingerprint of the search block and at least one of the broadcast fingerprints, wherein the at least one media device fingerprint corresponds with at least one of the media device frames, and wherein the at least one broadcast fingerprint corresponds with at least one of the broadcast frames, and determining, based on the established match correlation, that the at least one media device frame has metadata corresponding with the at least one broadcast frame, the metadata comprising a broadcast channel identification and frame location.

17. The non-transitory memory of claim 16, wherein the operations further include:

determining whether the search block includes at least one media device fingerprint having the match correlation to more than one broadcast fingerprint, and when the search block includes at least one media device fingerprint having the match correlation to more than one broadcast fingerprint, (i) determining a set of broadcast fingerprints corresponding to the at least one media device fingerprint of the search block, each broadcast fingerprint of the set of broadcast fingerprints being broadcast fingerprints of sequentially adjacent broadcast frames of the broadcast media stream and (ii) determining the match correlation as a Pearson correlation coefficient between the search block and the set of broadcast fingerprints.

18. The non-transitory memory of claim 16, wherein the operations further include determining a match media device frame as the media device frame corresponding to the media device fingerprint of the at least one media device fingerprint of the search block having the greatest Pearson correlation coefficient with a match broadcast fingerprint of the set of broadcast fingerprints.

19. The non-transitory memory of claim 16, wherein comparing the search block of the media device fingerprints with the broadcast fingerprints comprises comparing the search block to a database structure defined by a plurality of broadcast fingerprints wherein the database structure is a binary search tree.

* * * * *